(12) United States Patent
Sears et al.

(10) Patent No.: US 12,189,218 B2
(45) Date of Patent: Jan. 7, 2025

(54) THERMAL ACTIVATED SWITCHING POLARIZER

(71) Applicant: Meta Platforms Technologies, LLC, Menlo Park, CA (US)

(72) Inventors: Jasmine Soria Sears, Kirkland, WA (US); Scott Charles McEldowney, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 430 days.

(21) Appl. No.: 17/526,706

(22) Filed: Nov. 15, 2021

(65) Prior Publication Data

US 2023/0152609 A1 May 18, 2023

(51) Int. Cl.
*G02B 5/30* (2006.01)
*G02B 27/01* (2006.01)
*G02F 1/01* (2006.01)

(52) U.S. Cl.
CPC ....... *G02F 1/0136* (2013.01); *G02B 27/0172* (2013.01); *G02F 1/0147* (2013.01); *G02B 2027/0118* (2013.01)

(58) Field of Classification Search
CPC ..... G02B 5/3025; G02B 5/3058; G02F 1/009; G02F 1/132; G02F 1/0147
See application file for complete search history.

(56) References Cited

U.S. PATENT DOCUMENTS

2015/0286073 A1* 10/2015 Blum ............ G02C 7/101
359/241

OTHER PUBLICATIONS

Parrott E. P. J., et al., "Vanadium Dioxide Devices for Terahertz Wave Modulation: A Study of Wire Grid Structures," Nanotechnology, vol. 27, No. 20, Apr. 12, 2016, 9 pages. (Year: 2016).*
International Search Report and Written Opinion for International Application No. PCT/US2022/049829, mailed Mar. 20, 2023, 9 pages.
Parrott E. P. J., et al., "Vanadium Dioxide Devices for Terahertz Wave Modulation: A Study of Wire Grid Structures," Nanotechnology, vol. 27, No. 20, Apr. 12, 2016, 9 pages.
Peng R-W., et al., "Dynamically-Tunable Plasmonic Devices Based on Phase Transition of Vanadium Dioxide," Conference on Lasers and Electro-Optics (CLEO), May 5, 2019, 2 pages.
International Preliminary Report on Patentability for International Application No. PCT/US2022/049829, mailed May 30, 2024, 7 pages.

* cited by examiner

Primary Examiner — Joseph P Martinez
(74) Attorney, Agent, or Firm — Freestone Intellectual Property Law PLLC; Aaron J. Visbeek

(57) ABSTRACT

A switchable polarizer includes a transparent layer and switchable material layer. The switchable material layer includes strips of a switchable material that are arranged to polarize incident light propagating through the transparent layer when the switchable material is heated to a threshold switching temperature. The incident light propagating through the transparent layer is unpolarized by the strips of the switchable material when the switchable material is below the threshold switching temperature.

18 Claims, 9 Drawing Sheets

THERMAL ACTIVATED SWITCHING POLARIZER

TECHNICAL FIELD

This disclosure relates generally to optics, and in particular to dimming and polarization.

BACKGROUND INFORMATION

A smart device is an electronic device that typically communicates with other devices or networks. In some situations the smart device may be configured to operate interactively with a user. A smart device may be designed to support a variety of form factors, such as a head mounted device, a head mounted display (HMD), or a smart display, just to name a few.

Smart devices may include one or more components for use in a variety of applications, such as gaming, aviation, engineering, medicine, entertainment, video/audio chat, activity tracking, and so on. In some examples, a smart device may include one or more optical elements.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
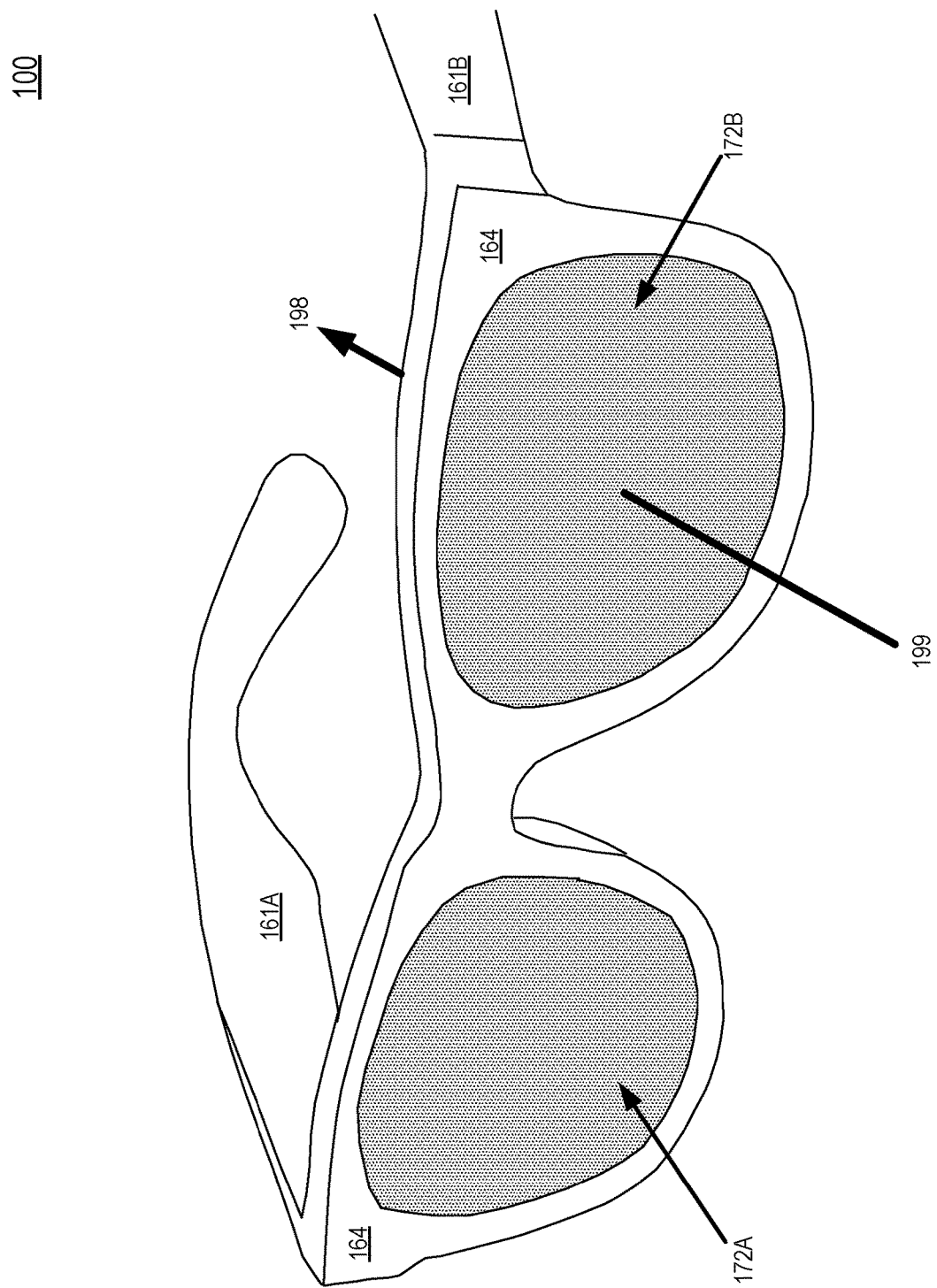
FIG. 1 illustrates an example head mounted device that includes thermally activated switchable polarizer optical elements, in accordance with aspects of the disclosure.

Embodiments of a thermal activated switchable polarizer are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one implementation" or "an implementation" means that a particular feature, structure, or characteristic described in connection with the implementation is included in at least one implementation of the present invention. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 μm.

The optical elements, systems, devices, and techniques described in this disclosure may be used in prescription glasses, non-prescription sunglasses, head mounted devices, and/or other optical systems, for example. Implementations of this disclosure include a thermally activated switchable polarizer.

In an example implementation, the switchable polarizer is driven between a polarizing state and a transparent state by selectively heating strips of switchable material that are arranged similarly to a wire-grid polarizer. When the strips of the switchable material are below a threshold switching temperature (e.g. approximately 60 degrees Celsius) the switching material (e.g. vanadium dioxide) is substantially transparent to visible light and incident light retains its polarization orientation as it propagates through the strips of the switching material. And when the strips of the switchable material are heated to a threshold switching temperature (e.g. approximately 60 degrees Celsius) the switching material (e.g. vanadium dioxide) becomes opaque and an electrical conductor so that the strips function as polarizers that polarize incident light.

The strips of the switchable material may be thermally regulated by a thermal module to facilitate switching the switchable polarizer between a polarizing state and a transparent state. In an implementation, an electrical current is driven through the strips of the switchable material to control the temperature of the strips. The switchable material may be electrically resistive (or have semiconductor properties) and therefore driving current through the strips of the switchable material heats the strips to the threshold switching temperature. At or above the threshold switching temperature, the switching material may be a metal and therefore electrically conductive and facilitate polarizing incident light. In another implementation, a transparent conductor layer (e.g. indium tin oxide) is disposed to impart heat to the strips of the switchable material. In another implementation, an illumination module is configured to selectively illuminate the strips of the switching material with infrared light to heat the strips. These and other implementations are described in more detail in connection with FIGS. 1-7.

FIG. 1 illustrates an example head mounted device 100 that includes thermally activated switchable polarizer optical elements 172A and 172B, in accordance with aspects of the disclosure. Head mounted device 100 include arms 161A and 161B coupled to a frame 164. Switchable polarizer optical elements 172A and 172B (collectively referred to as optical elements 172) are included in frame 164. When a switchable polarizer optical element 172 is driven to a transparent state, incident light 199 propagates through the optical element 172 and retains its polarization orientation as transmitted light 198. However, when switchable polarizer optical element 172 is driven to a polarizing state, incident light 199 propagating through the optical element 172 will become polarized transmitted light 198 since the strips of the switchable material will polarize incident light 199 (by absorbing and/or reflecting a particular polarization orientation of incident light 199) when the strips are heated to the threshold switching temperature. For example, a horizontal polarization orientation of incident light 199 may propagate through optical element 172 while the vertical polarization orientation of incident light 199 may be absorbed/reflected by the strips of the switching material when optical element 172 is driven to the polarizing state.

Figure 2:
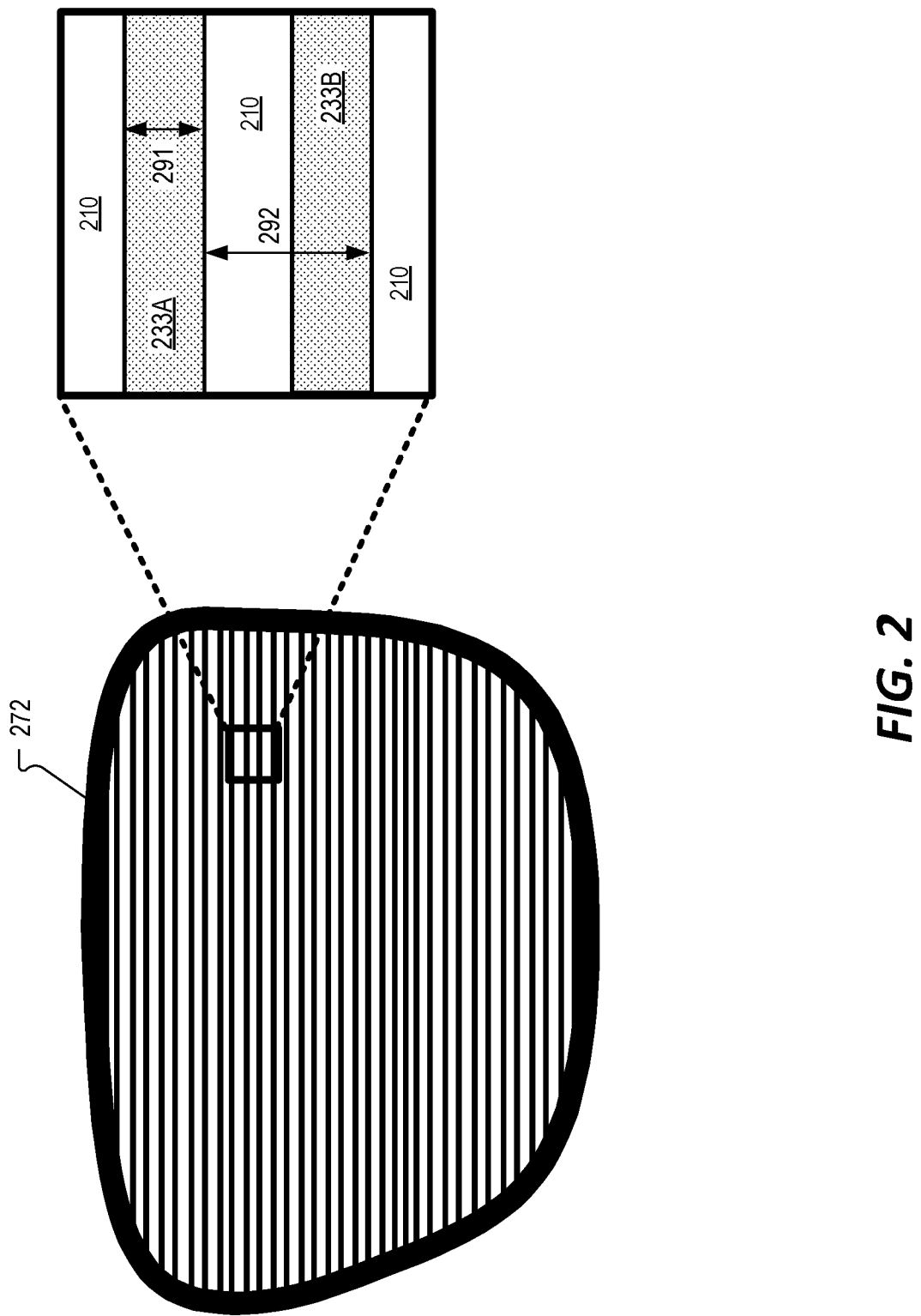
FIG. 2 illustrates an example optical element and an exploded view of a portion of the optical element that includes horizontal strips of a switching material, in accordance with aspects of the disclosure.

FIG. 2 illustrates an example optical element 272 and an exploded view of a portion of optical element 272 that includes horizontal strips 233 of a switching material, in accordance with aspects of the disclosure. Optical element 272 is shaped as a lens that may be included in a head mounted device, such as head mounted device 100. However, the optical element 272 may be shaped and sized to whatever optical system or device it will be included in.

The exploded portion of FIG. 2 illustrates two horizontal strips 233A and 233B of a switching material that is disposed over a transparent layer 210. Transparent layer 210 may be glass or plastic, for example. FIG. 2 illustrates that strips 233A and 233B (collectively referred to as strips 233) may be arranged periodically to facilitate polarizing light when the strips are heated to the threshold switching temperature. The width of the strips 233 is dimension 291 and the period of the strips is dimension 292. The period includes the width of a strip 233 and the spacing between the strips. In implementations of the disclosure, the period 292 of the strips 233 may be less than 450 nm to avoid diffraction of visible light wavelengths. A width 291 of the strips of the switchable material may be less than or equal to half of the period 292. The threshold switching temperature may be between 50 and 70 degrees Celsius, in some implementations. In some implementations of the disclosure, a switching material may be defined by any material that can switch between a metal and non-metal in response to heat. In some implementations of the disclosure, the switching material is an electrochromic material.

While the strips 233 in optical element 272 are oriented horizontally, the strips may be arranged vertically, or at other angles, depending on the context. Arranging the strips with the horizontal orientation may block sunlight glare, for example. In another context, the strips may be aligned vertically to block polarized light emitted by a polarized display for example.

Figure 3A:
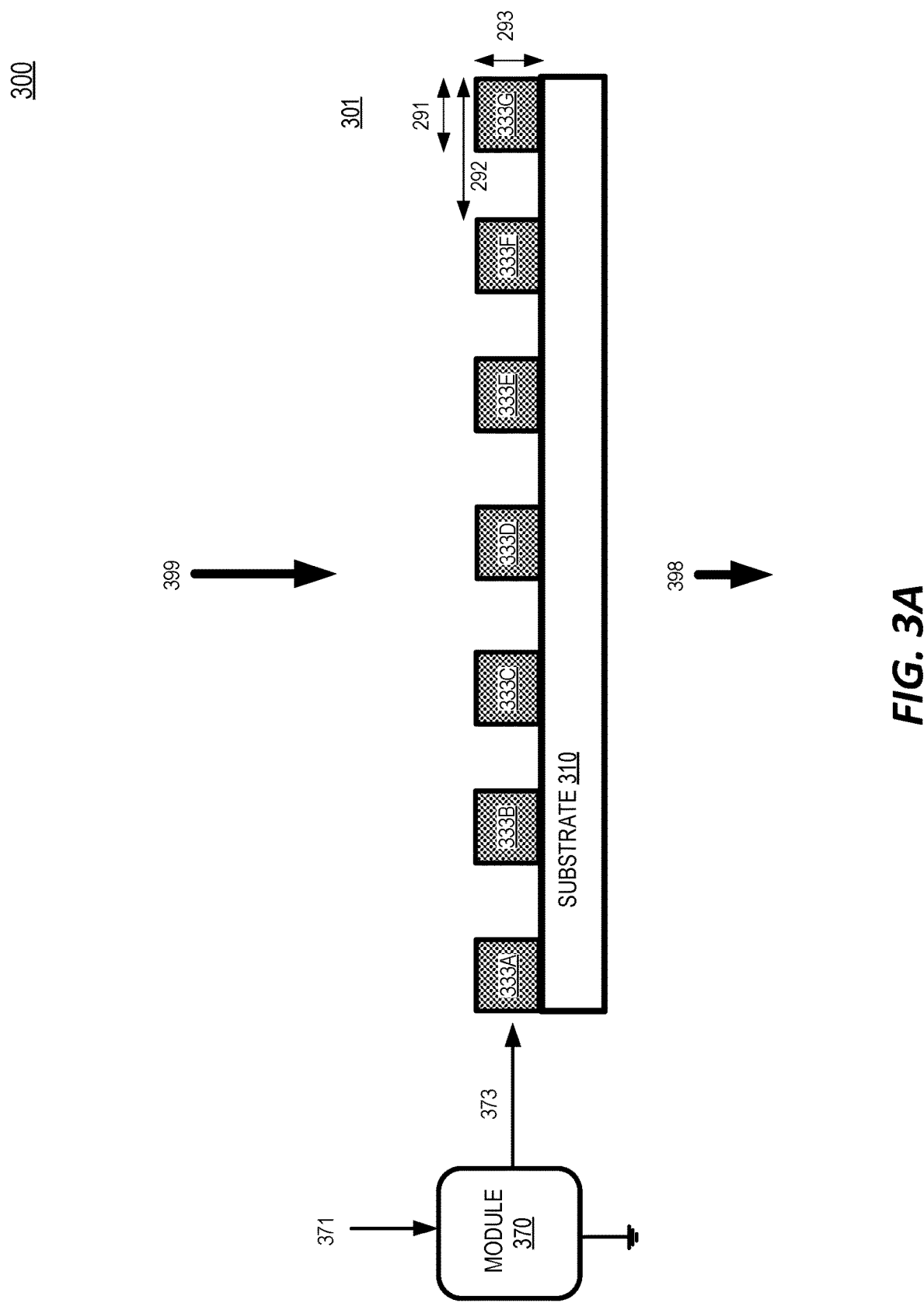
FIG. 3A illustrates a system including a heating module and a side view of a switchable polarizer optical element, in accordance with aspects of the disclosure.

FIG. 3A illustrates a system 300 including a heating module 370 and a side view of a switchable polarizer optical element 301, in accordance with aspects of the disclosure. Heating module 370 is configured to drive an electrical current signal 373 in response to an input signal 371. Input signal 371 may control whether switchable polarizer optical element 301 is driven to a polarizing state or a transparent state.

In FIG. 3A, the electrical current signal 373 is driven onto strips 333A, 333B, 333C, 333D, 333E, 333F, and 333G (collectively referred to as strips 333) when input signal 371 indicates a polarizing state for switchable polarizer optical element 301. A first end of the strips 333 may have a different voltage potential than a second (opposite) end of the strips 333 when the current is driven onto the strips. The switchable material may be a resistive electrical element or a semiconductor when the switchable material is below the threshold switching temperature. Therefore, driving a current through the switchable material of the strips 333 can heat the strips. When the strips 333 reach a threshold switching material (e.g. 60 degrees Celsius), the strips 333 change to a conductive state (rather than being a resistor or semiconductor state) and also function as a polarizing grid because of the conductive state. When the switching material is in a resistive state or semiconductor state, the strips of the switching material do not function as a polarizing grid.

In an implementation, the switchable material is substantially transparent when the switchable material is below the threshold switching temperature and the switchable material is substantially opaque when the switchable material is at or above the threshold switching temperature. When vanadium dioxide is used as the switching material, the strips may have a slightly yellow tint (substantially transparent) in the transparent state of optical element 301 and turn to dark blue (substantially opaque) in the polarizing state.

In aspects of this disclosure, the term "transparent" may be defined as having greater than 90% transmission of light. In some aspects, the term "transparent" may be defined as a material having greater than 90% transmission of visible light. The term "substantially transparent" may be defined as greater than 75% transmission of visible light and the term "substantially opaque" may be defined as less than 25% of visible light.

FIG. 3A illustrates that a height 293 of strips 333 of the switchable material may be approximately the same as a width 291 of the strips 333, in some implementations. The strips 333 are disposed on a transparent substrate 310. Strips 333 may directly contact substrate 310 or be bonded to substrate 310 with an adhesive. Incident light 399 encounters substrate 310 normal to a plane of substrate 310, in FIG. 3A. Strips 333 of the switchable material are arranged to polarize incident light 399 propagating through the transparent substrate layer 310 when the switchable material is heated to a threshold switching temperature. Hence, transmitted light 398 is polarized when the strips 333 are heated to the threshold switching temperature. Incident light 399 propagating through transparent substrate layer 310 is unpolarized by the strips 333 of the switchable material when the switchable material is below the threshold switching temperature. Hence, transmitted light 398 is unpolarized when the strips 333 are below the threshold switching temperature.

Figure 3B:
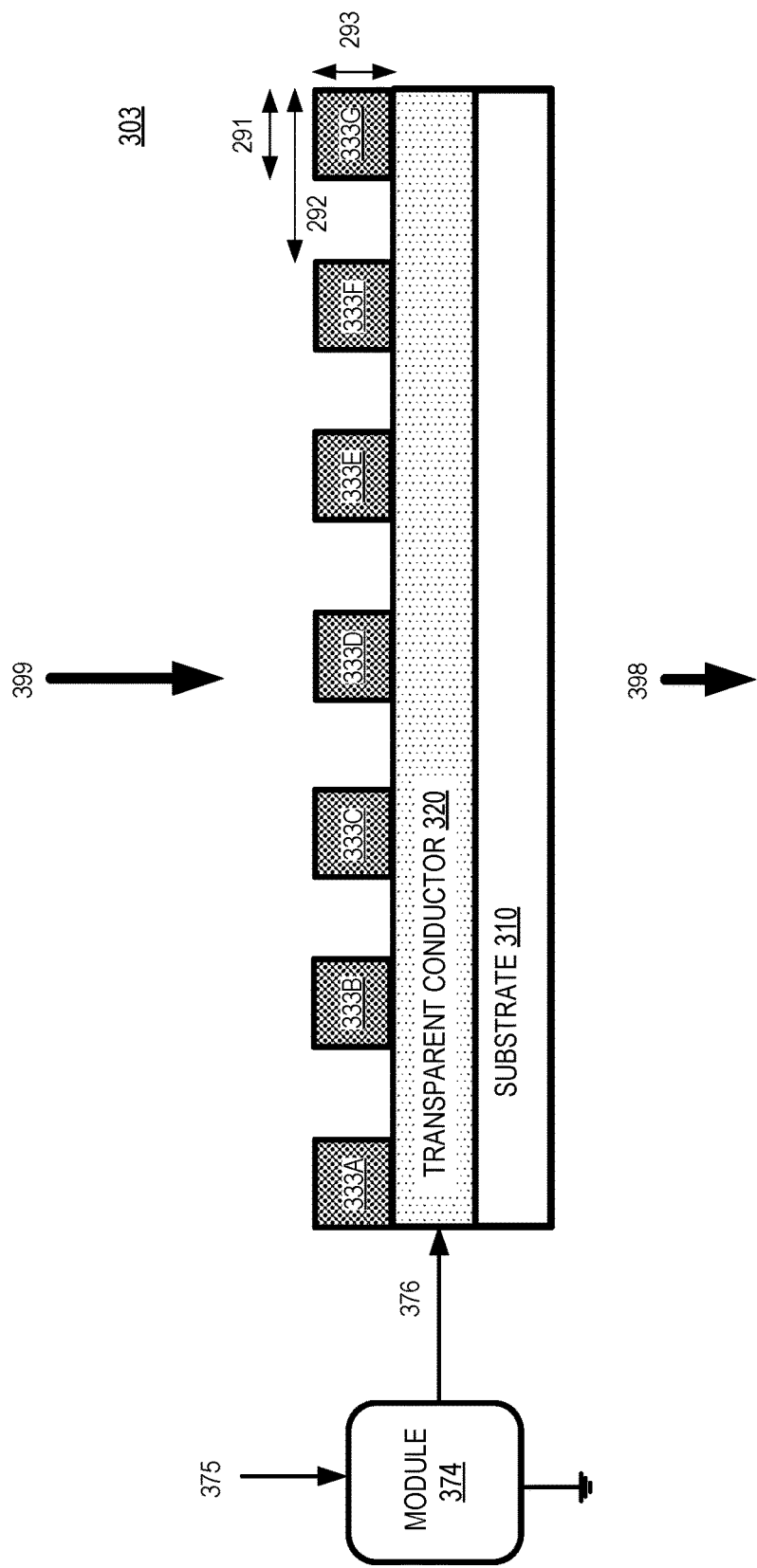
FIG. 3B illustrates a system including a heating module and a side view of a switchable polarizer optical element including a transparent conductor, in accordance with aspects of the disclosure.

FIG. 3B illustrates a system 302 including a heating module 374 and a side view of an example switchable polarizer optical element 303, in accordance with aspects of the disclosure. Heating module 374 is configured to drive an electrical current signal 376 in response to an input signal 375. Input signal 375 may control whether switchable polarizer optical element 303 is driven to a polarizing state or a transparent state.

Instead of driving current onto strips 333 to heat strips 333 as in system 300 of FIG. 3A, system 302 includes a transparent conductor layer 320 that is heated by an electrical current to impart heat to strips 333. Transparent conductor layer 320 is disposed between substrate 310 and strips 333. Transparent conductor layer 320 may be indium tin oxide (ITO), in some implementations. Heating module 374 selectively drives electrical current signal 376 onto the transparent conductor layer 320 to change the strips 333 between the transparent state and the polarizing state. In some implementations, transparent conductor layer 320 is patterned to be selectively heated to facilitate pixelated switchable polarization of incident light 399. In other words, optical element 303 may have zones that are thermally controlled to above or below the threshold switching temperature so that some or a portion of the zones polarize incident light 399 and some zones do not polarize incident light 399.

Figure 3C:
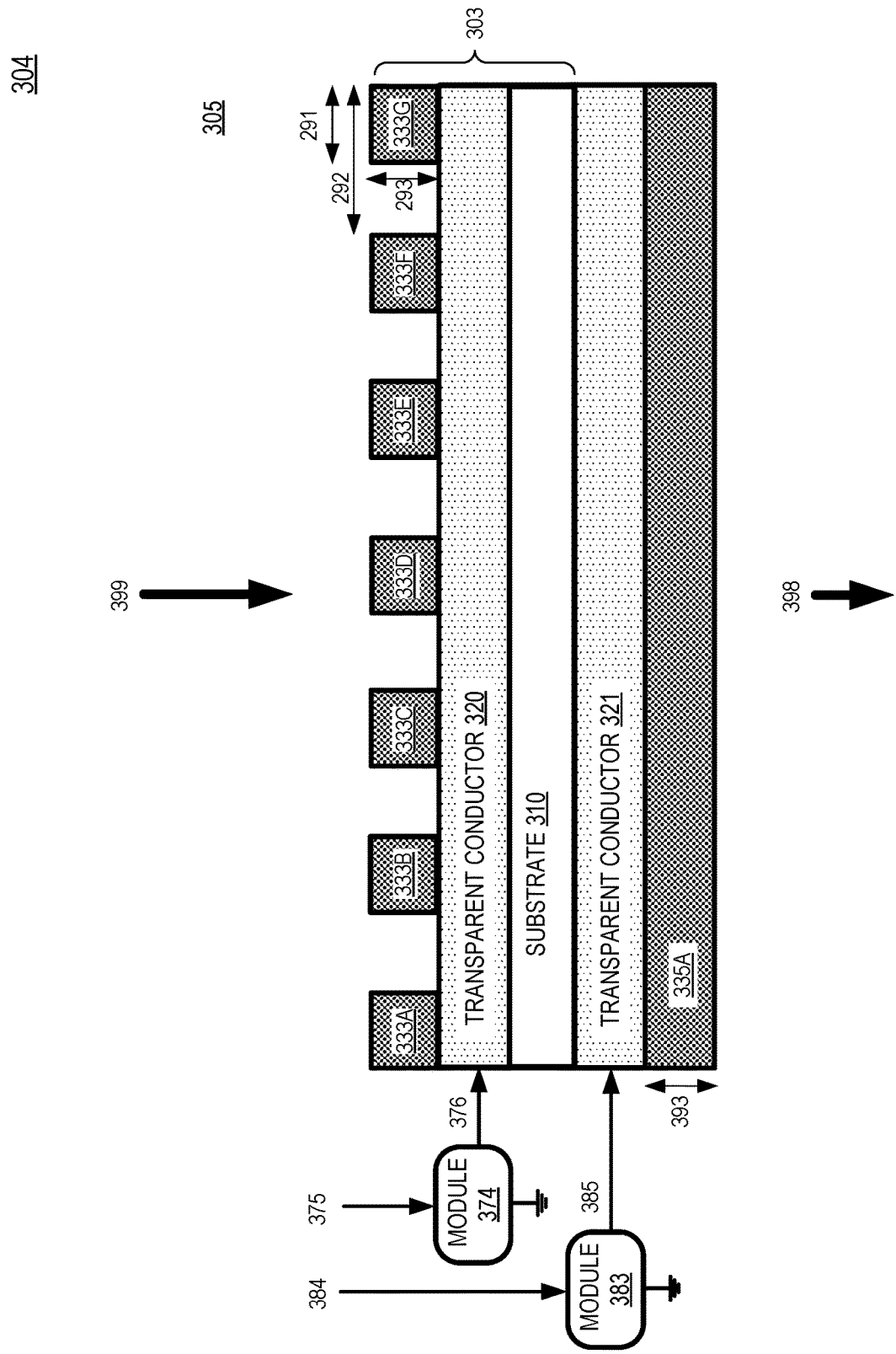
FIG. 3C illustrates a system including a dual-orientation switchable polarization optical element, in accordance with aspects of the disclosure.

FIG. 3C illustrates a system 304 including a dual-orientation switchable polarization optical element 305, in accordance with implementations of the disclosure. In addition to the optical element 303 of FIG. 3B, dual-orientation switchable polarization optical element 305 includes a second transparent conductor layer 321 and second strips 335A in a second switchable material layer. In FIG. 3C, the second strips 335A of the switchable material are disposed orthogonal to strips 333 so only the first strip 335A is visible in the side view of FIG. 3C. The remaining strips 335 are periodically arranged behind strip 335A and are thus not visible in FIG. 3C. First strips 333 are configured to polarize incident light 399 to a first polarization orientation and second strips 335A are configured to polarize incident light 399 to a second polarization orientation that is orthogonal to the first polarization. Therefore, second strips 335A of the switchable material are arranged to polarize the incident light 399 propagating through the transparent layer 310 to the second polarization orientation when the second strips 335A are heated to the threshold switching temperature. Second strips 335A may have a height 393 that is similar to, or different from, the height 293 of strips 333. The width and period of the second strips may be the same or different than the width 291 and period 292 of strips 333.

In FIG. 3C, transparent substrate layer 310 may be sized to have a thickness to allow layer 310 to serve as a thermal insulator between transparent conductor layer 320 and transparent conductor layer 321. Transparent conductor layer 321 may be patterned to facilitate pixelated switchable polarization of transparent conductor layer 321. Transparent conductor layer 321 may also include the additional features described with respect to transparent conductor layer 320.

Heating module 383 is configured to drive an electrical current signal 385 in response to an input signal 384. Input signal 384 may control whether second strips 335 are heating to the threshold switching temperature that causes second strips 335 to polarize incident light 399 to the second polarization orientation. The polarization orientation of transmitted light 398 may be selected to be a first polarization orientation (by heating strips 333 to the threshold switching temperature with heating module 374) or to be selected to be the second polarization orientation (by heating strips 335 to the threshold switching temperature with heating module 383). The first polarization orientation may be a linear horizontal polarization and the second polarization orientation may be a linear vertical polarization that is orthogonal to the first polarization orientation. In some implementations, the first polarization orientation is different from the second polarization orientation, but the first polarization orientation is not necessarily orthogonal to the second polarization orientation.

Dual-orientation switchable polarization optical element 305 can be selectively driven to polarize light 399 into a first polarization orientation of transmitted light 398 by selectively heating strips 333 or dual-orientation switchable polarization optical element 305 can be selectively driven to polarize light 399 into a second polarization orientation of transmitted light 398 by selectively heating strips 335. In some implementations, strips 333 and 335 are heated to the threshold switching temperature simultaneously. When strips 333 and 335 are arranged orthogonal to each other, the intensity of transmitted light 398 may approach zero as both polarization orientations (e.g. vertical polarized light and horizontal polarized light) are not transmitted when both strips 333 and 335 are heated above the threshold switching temperature. Thus, dual-orientation switchable polarization optical element 305 may be used as a global dimmer and/or a zoned dimmer when the transparent conductor layers 320 and 321 are patterned to include zones that can be selectively heated.

In some implementations of the disclosure, strips 333 and/or 335 are configured to block a wavelength band of visible light within incident light 399 when the strips are heated to the threshold switching temperature. To block a particular wavelength band of visible light, the strip dimensions (e.g. height 293 and width 291) and/or the period (e.g. 292) of the strips are tuned to block the particular wavelength. In an example implementation, the strips may be configured to block green visible light. Since human eyes are particularly sensitive to green light, this may be advantageous in the context of near-eye optical elements. In another example implementation, the strips are configured to block a set of wavelengths to give the optical element a particular vanity tint when the optical elements are used in glasses.

In an implementation, the period of the strips 333 and/or 335 are configured to reflect a plurality of wavelength bands of visible light when the switchable material is heated to the threshold switching temperature.

Figure 4A:
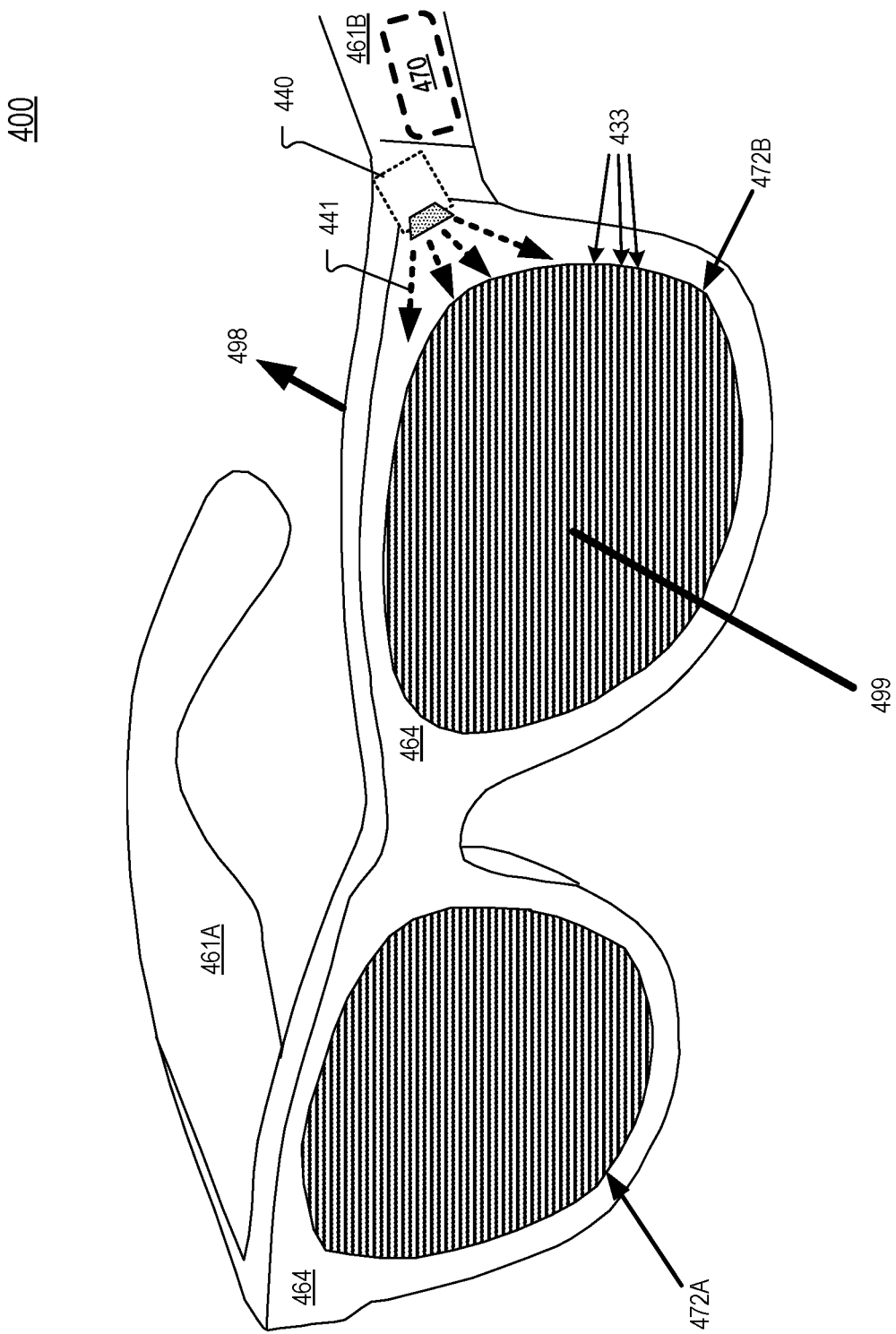
FIGS. 4A-4B illustrate an example head mounted device that includes an illumination module for selectively heating strips included in a switchable polarizer optical element to selectively polarize incident light, in accordance with aspects of the disclosure.

FIG. 4A illustrates an example head mounted device 400 that includes an illumination module 440 for selectively heating strips 433 included in a switchable polarizer optical element 472B to selectively polarize incident light 499, in accordance with aspects of the disclosure. Strips 433 in FIG. 4A may have the same characteristics as described with respect to strips 333.

Head mounted device 400 include arms 461A and 461B coupled to a frame 464. Optical elements 472A and 472B (collectively referred to as optical elements 472) are included in frame 464. When a switchable polarizer optical element 472 is driven to a transparent state, incident light 499 propagates through the optical element 472 and retains its polarization orientation as transmitted light 498. However, when switchable polarizer optical element 472 is driven to a polarizing state, incident light 499 propagating through the optical element 472 will become polarized transmitted light 498 since the strips 433 of the switchable material will polarize incident light 499 (by absorbing and/or reflecting a particular polarization orientation of incident light 499) when the strips are heated to the threshold switching temperature. For example, a horizontal polarization orientation of incident light 499 may propagate through optical element 472 while the vertical polarization orientation of incident light 499 may be absorbed/reflected by the strips of the switching material when optical element 472 is driven to the polarizing state.

In FIG. 4A, strips 433 of the switching material are selectively heated by illuminating the strips 433 with patterned infrared illumination light 441. Processing logic 470 may drive illumination module 440 to selectively illuminate strips 433 with patterned infrared illumination light 441. Illumination module 440 may include a projector that directs patterned infrared illumination light 441 to strips 433 to selectively modulate the temperature of the strips 433 to below or above the threshold switching temperature. Hence, illumination module 440 is the heating module for strips 433, in FIG. 4A. A display may be included in illumination module 440 to dynamically direct the patterned infrared illumination light 441 to strips 433. Illumination module 440 may include a two-dimensional mirrored scanner that scans infrared illumination light 441 to strips 433. In some implementations, the infrared illumination light 441 is directed to zones of optical element 472B so that portions of optical element 472B are polarizing (since the infrared illumination light 441 raises the temperature above the threshold switching temperature of the strip or portion of the strip). While FIG. 4A illustrates a single illumination module 440 for illuminating the strips 433 in optical element 472B, of course a second illumination module may be included in head mounted device 400 to illuminate strips 433 of optical element 472A with infrared illumination light.

Figure 4B:
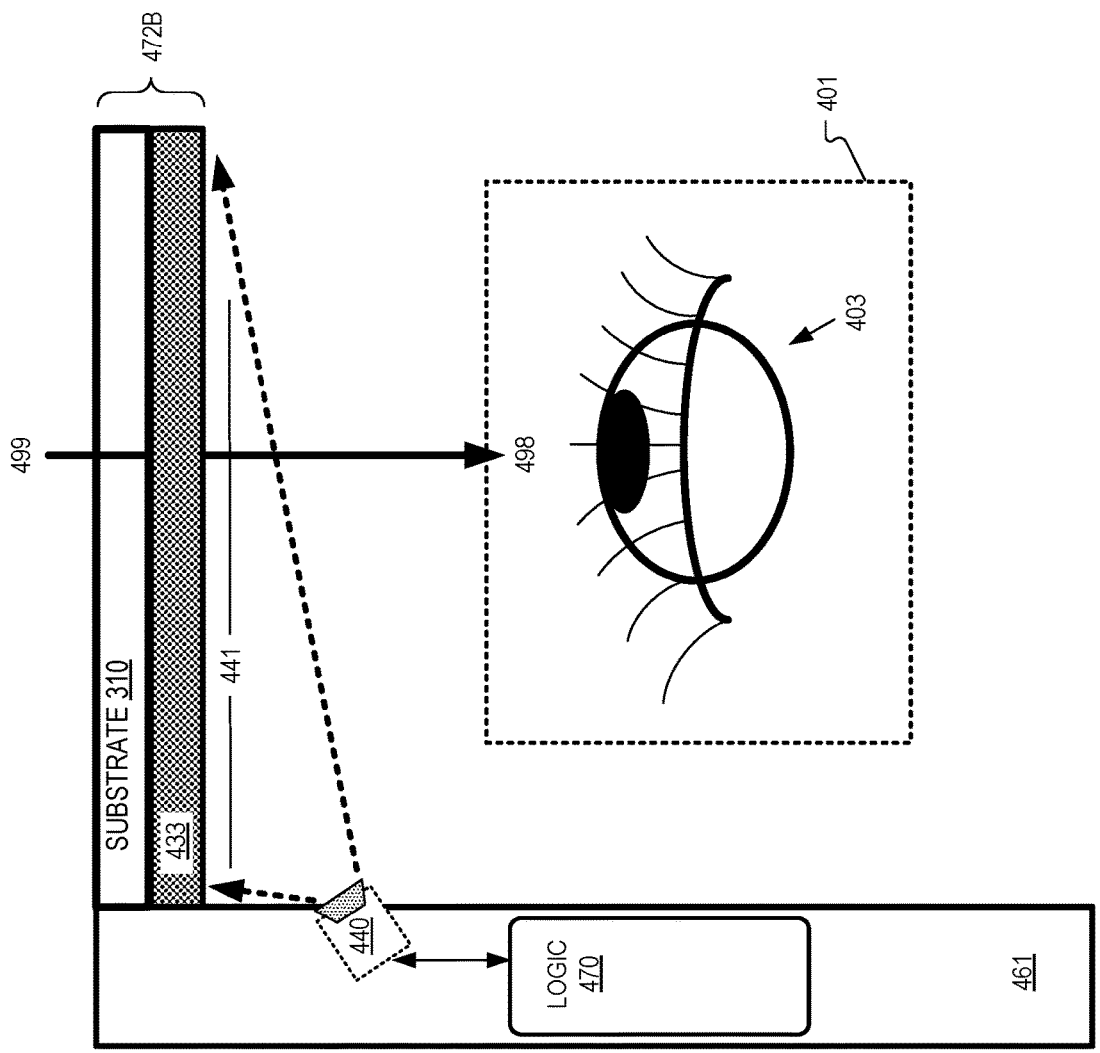

FIG. 4B illustrates a top view of a portion of head mounted device 400, in accordance with aspects of the disclosure. FIG. 4B shows an example optical element 472B includes transparent substrate 310 and strips 433. Switchable polarizer optical element 472B selectively polarizes incident light 499 propagating to an eye 403 of a user that occupies an eyebox region 401.

Figure 5:
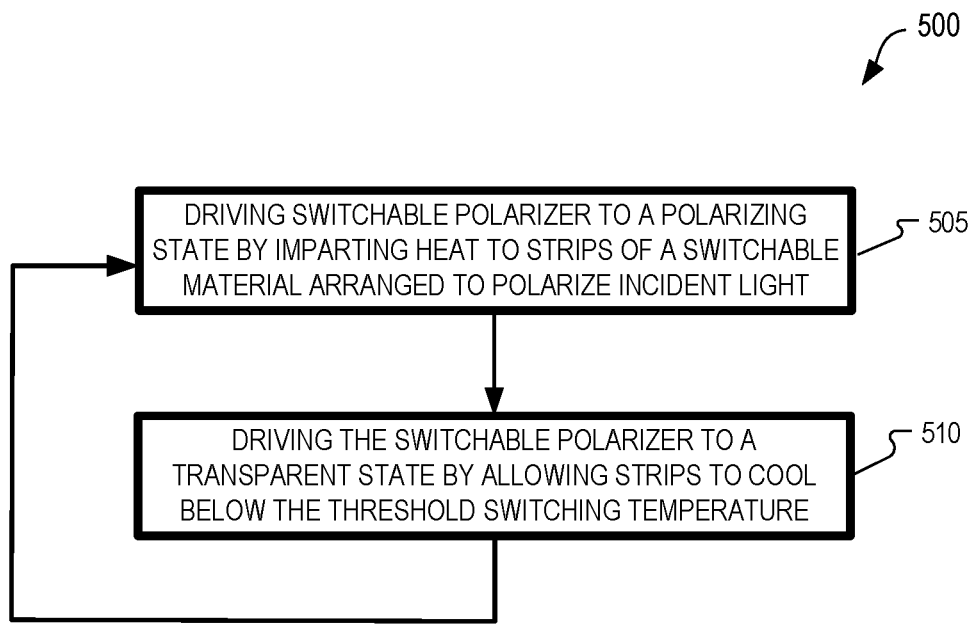
FIG. 5 illustrates a flow chart illustrating an example process of operating a switchable polarizer, in accordance with aspects of the disclosure.

FIG. 5 illustrates a flow chart illustrating an example process 500 of operating a switchable polarizer, in accordance with aspects of the disclosure. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel. All or a portion of process 500 may be executed by processing logic included in a head mounted device.

In process block 505, the switchable polarizer is driven to a polarizing state. Driving the switchable polarizer to the polarizing state includes imparting heat to strips of a switchable material that are arranged to polarize incident light when the switchable material is heated to a threshold switching temperature.

In process block 510, the switchable polarizer is driven to a transparent state. Driving the switchable polarizer to the transparent state includes allowing the strips to cool below the threshold switching temperature. Process 500 may return to process block 505 subsequent to executing process block 510.

In implementations of the disclosure, imparting the heat to the strips of the switchable material includes illuminating the strips of the switchable material with infrared light. In implementations of the disclosure, imparting the heat to the strips of the switchable material includes driving electrical current through a transparent substrate.

Figure 6:
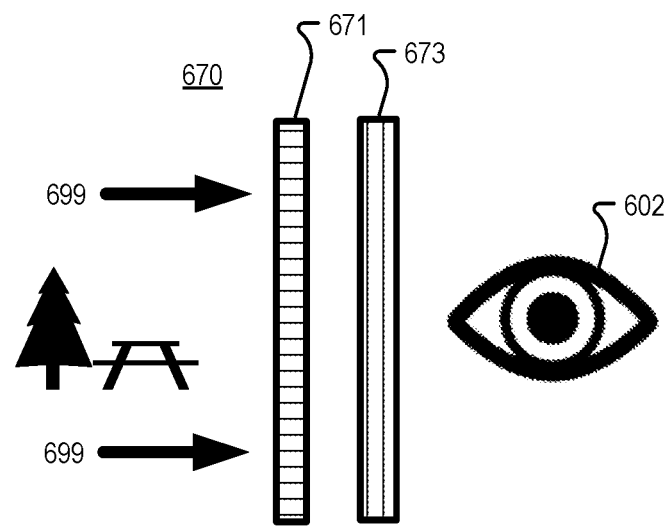
FIG. 6 illustrates an optical system having a switchable polarizer layer and a second polarizer layer, in accordance with aspects of the disclosure.

FIG. 6 illustrates an optical system 670 having a switchable polarizer layer 671 and a second polarizer layer 673, in accordance with aspects of the disclosure. Switchable polarizer layer 671 may include the switchable polarizer optical elements 301 or 303 of FIGS. 3A and 3B. Second polarizer layer 673 includes lines (e.g. wire-grid polarizing lines) that are disposed perpendicular (or nearly perpendicular) to the strips 333 of switchable polarizer layer 671. Disposing the lines of second polarizer layer 673 perpendicular to strips 333 of switchable polarizer layer 671 may increase the percentage of incident light 699 that is blocked by optical system 670.

Second polarizer layer 673 may be a switchable polarizer, in some implementations, and include the switchable polarizer optical elements 301 or 303 of FIGS. 3A and 3B. When second polarizer layer 673 is a switchable polarizer, switchable polarizer layer 671 and second polarizer layer 673 may be both driven to a polarization state at a same time to increase the percentage of incident light 699 that is blocked by the orthogonal strips 333 included in layers 671 and 673. In another context, switchable polarizer layer 671 and second polarizer layer 673 may be both driven to a transmissive state at a same time to increase the percentage of incident light 699 that propagates through optical system 670 to eye 602.

Figure 7:
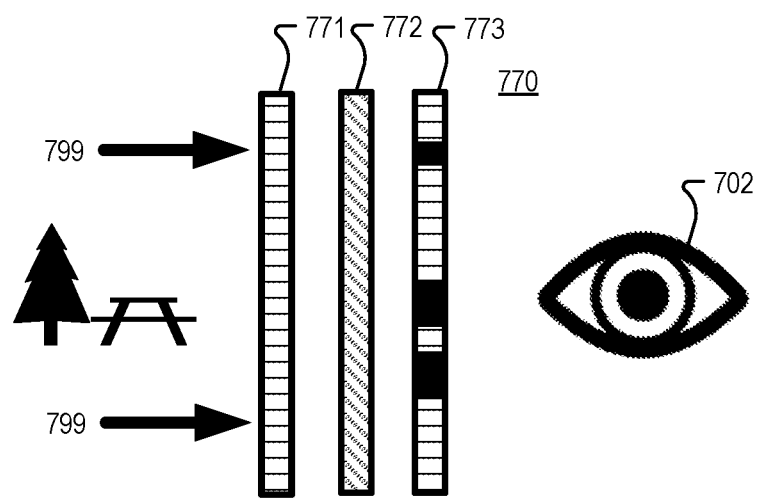
FIG. 7 illustrates an optical system that includes switchable polarizers, in accordance with aspects of the disclosure.

FIG. 7 illustrates an optical system 770 that includes switchable polarizers, in accordance with implementations of the disclosure. Optical system 770 includes a first switchable polarizer 771, a pixelated switchable polarization-rotating layer 772, and a second switchable polarizer 773. Switchable polarization-rotating layer 772 may be a switchable quarter-waveplate or a switchable half-waveplate, for example. Liquid crystal technology may be utilized in switchable polarization-rotating layer 772. Switchable polarizer optical elements 301 or 303 of FIGS. 3A and 3B may function as first switchable polarizer 771 and/or second switchable polarizer 773. Optical system 770 may be incorporated into a near-eye optical element (such as in near-eye optical element(s) 172) to modulate the polarization of incident scene light 799 that propagates to eye 702. Using switchable polarizers instead of static polarizers increases the maximum transmission of scene light 799 to eye 702 as well as allowing optical system 770 to be selectively mostly transmissive (by way of selectively cooling the strips of switching material of switchable polarizers 771 and 773). Consequently, when system 770 is included in a near-eye optical element (e.g. optical element 172), the near-eye optical elements don't necessarily appear dark in indoor environments where it would be desirable for the near-eye optical elements to appear in a transmissive (clear) state, for example.

In operation, the pixelated switchable polarization rotating layer 772 is driven to control the polarization state of the output light propagating towards switchable polarizer 773. For the pixels that are to appear dark, the pixels in pixelated switchable polarization-rotating layer 772 are driven so that the polarization orientation of the output light for a particular pixel are absorbed by the switchable polarizer 773. For the pixels that are to transmit the light, the pixels in pixelated switchable polarization-rotating layer 772 are driven so that the polarization orientation of the output light for a particular pixel propagates through the switchable polarizer 773.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g. processing logic 470) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Networks may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, BlueTooth, SPI (Serial Peripheral Interface), I2C (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described.

Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A switchable polarizer comprising:
a transparent layer;
a switchable material layer including strips of a switchable material that are arranged to polarize incident light propagating through the transparent layer when the switchable material is heated to a threshold switching temperature, and wherein the incident light propagating through the transparent layer is unpolarized by the strips of the switchable material when the switchable material is below the threshold switching temperature; and
a transparent conductor layer disposed between the transparent layer and the switchable material layer, wherein the transparent conductor layer is configured to impart the threshold switching temperature to the strips of the switchable material.

2. The switchable polarizer of claim 1, wherein the switchable material is substantially transparent when the switchable material is below the threshold switching temperature, and wherein the switchable material is substantially opaque when the switchable material is at or above the threshold switching temperature.

3. The switchable polarizer of claim 1, wherein the switchable material is a resistive electrical element or a semiconductor when the switchable material is below the threshold switching temperature, and wherein the switchable material is an electrical conductor when the switchable material is at or above the threshold switching temperature.

4. The switchable polarizer of claim 3, wherein the switchable material is vanadium dioxide.

5. The switchable polarizer of claim 1, wherein the transparent conductor layer is patterned to be selectively heated to facilitate pixelated switchable polarization of the incident light propagating through the transparent layer.

6. The switchable polarizer of claim 1, wherein the strips of the switchable material are arranged to polarize the incident light propagating through the transparent layer to a first polarization orientation, and wherein the switchable polarizer further comprises:

a second switchable material layer including second strips of the switchable material that are arranged to polarize the incident light propagating through the transparent layer to a second polarization orientation when the second strips are heated to the threshold switching temperature, and wherein the first polarization orientation is orthogonal to the second polarization orientation.

7. The switchable polarizer of claim 1, wherein the threshold switching temperature is between 50 and 70 degrees Celsius.

8. The switchable polarizer of claim 1, wherein the strips of the switchable material are arranged in a periodic pattern having a period of less than 450 nm.

9. The switchable polarizer of claim 8, wherein the period of the strips is configured to block a wavelength band of visible light when the switchable material is heated to the threshold switching temperature.

10. The switchable polarizer of claim 8, wherein the period of the strips is configured to reflect a plurality of wavelength bands of visible light when the switchable material is heated to the threshold switching temperature.

11. The switchable polarizer of claim 8, wherein a width of the strips of the switchable material is less than or equal to half of the period.

12. The switchable polarizer of claim 11, wherein a height of the strips of the switchable material is approximately the same as the width of the strips.

13. A head mounted device comprising:
    an optical element including:
        a transparent layer; and
        a switchable material layer including strips of a switchable material that are arranged to polarize incident light propagating through the transparent layer when the switchable material is heated to a threshold switching temperature, and wherein the incident light propagating through the transparent layer is unpolarized by the strips of the switchable material when the switchable material is below the threshold switching temperature; and
    a heating module configured to selectively drive electrical current through the strips of the switchable material to heat the strips of the switchable material to the threshold switching temperature to facilitate a polarized state of the optical element.

14. The head mounted device of claim 13, wherein the strips of the switchable material are arranged to polarize the incident light propagating through the transparent layer to a first polarization orientation, and wherein the optical element further comprises:
    a second switchable material layer including second strips of the switchable material that are arranged to polarize the incident light propagating through the transparent layer to a second polarization orientation when the second strips are heated to the threshold switching temperature, and wherein the first polarization orientation is orthogonal to the second polarization orientation.

15. The head mounted device of claim 13, wherein the strips of the switchable material are arranged in a periodic pattern having a period of less than 450 nm.

16. The head mounted device of claim 15, wherein the period of the strips is configured to block a wavelength band of visible light when the switchable material is heated to the threshold switching temperature.

17. The method of claim 13, wherein the strips of the switchable material are arranged in a periodic pattern having a period of less than 450 nm.

18. A method of operating a switchable polarizer, the method comprising:
    driving the switchable polarizer to a polarizing state, wherein driving the switchable polarizer to the polarizing state includes imparting heat to strips of a switchable material that are arranged to polarize incident light when the switchable material is heated to a threshold switching temperature; and
    driving the switchable polarizer to a transparent state, wherein driving the switchable polarizer to the transparent state includes allowing the strips to cool below the threshold switching temperature, wherein imparting the heat to the strips of the switchable material includes illuminating the strips of the switchable material with infrared light.

\* \* \* \* \*